(12) United States Patent
Scherer et al.

(10) Patent No.: US 11,241,998 B2
(45) Date of Patent: Feb. 8, 2022

(54) WINDOW MOUNTED LIGHTING ASSEMBLY

(71) Applicant: Aptiv Technologies Limited, St. Michael (BB)

(72) Inventors: M. Jarod Scherer, Wakefield, RI (US); William Falk, Warwick, RI (US); Tyler Folger, Warren, RI (US)

(73) Assignee: APTIV TECHNOLOGIES LIMITED

( * ) Notice: Subject to any disclaimer, the term of this patent is extended or adjusted under 35 U.S.C. 154(b) by 0 days.

(21) Appl. No.: 17/004,706

(22) Filed: Aug. 27, 2020

(65) Prior Publication Data

US 2021/0078488 A1 Mar. 18, 2021

Related U.S. Application Data

(60) Provisional application No. 62/899,805, filed on Sep. 13, 2019.

(51) Int. Cl.
*B60Q 1/26* (2006.01)
*B60Q 3/208* (2017.01)
(Continued)

(52) U.S. Cl.
CPC .............. *B60Q 1/268* (2013.01); *B60J 1/18* (2013.01); *B60Q 1/0094* (2013.01); *B60Q 1/2696* (2013.01); *B60Q 1/302* (2013.01); *B60Q 1/50* (2013.01); *B60Q 3/208* (2017.02); *F21S 43/14* (2018.01); *F21S 43/19* (2018.01);
(Continued)

(58) Field of Classification Search
CPC .............. F21S 43/14–195; F21V 23/06; F21V 31/005; F21Y 2113/10; F21Y 2115/10; H01Q 1/1278; H05B 3/84; B60J 1/18; B60Q 1/0088–0094; B60Q 1/268;
(Continued)

(56) References Cited

U.S. PATENT DOCUMENTS 5,610,618 A * 3/1997 Adrian ................. H01Q 1/1271
343/711
8,130,156 B2 3/2012 Kittinger et al.
(Continued)

FOREIGN PATENT DOCUMENTS

CN 202669615 U 1/2013
DE 19507234 A1 9/1996
(Continued)

OTHER PUBLICATIONS

Extended European Search Report for EP Application No. 20193815.6, dated Nov. 25, 2020, 26 pages.

*Primary Examiner* — Jason M Han
(74) *Attorney, Agent, or Firm* — Billion & Armitage

(57) ABSTRACT

A lighting assembly includes a circuit board substrate having first and second conductive traces, a light emitting electrical device, and a pair of electrical terminals interconnected to the light emitting electrical device by the first and second conductive traces. The pair of electrical terminals are configured to mechanically secure the lighting assembly to a pair of corresponding electrical terminals mounted on a panel. The pair of electrical terminals are further configured to electrically connect the light emitting electrical device to third and fourth conductive circuit traces disposed on a surface of the panel.

20 Claims, 7 Drawing Sheets

(51) Int. Cl.
*F21S 43/14* (2018.01)
*F21S 43/19* (2018.01)
*B60J 1/18* (2006.01)
*B60Q 1/00* (2006.01)
*B60Q 1/30* (2006.01)
*B60Q 1/50* (2006.01)
*F21V 23/06* (2006.01)
*F21V 31/00* (2006.01)
*H01Q 1/12* (2006.01)
*H05B 3/84* (2006.01)
*F21Y 113/10* (2016.01)
*F21Y 115/10* (2016.01)

(52) U.S. Cl.
CPC ............ *F21V 23/06* (2013.01); *F21V 31/005* (2013.01); *H01Q 1/1278* (2013.01); *H05B 3/84* (2013.01); *F21Y 2113/10* (2016.08); *F21Y 2115/10* (2016.08)

(58) Field of Classification Search
CPC ........ B60Q 1/2696; B60Q 1/302; B60Q 1/50; B60Q 3/208
USPC .......................................... 362/503–504, 541
See application file for complete search history.

(56) References Cited

U.S. PATENT DOCUMENTS

| | | |
|---|---|---|
| 10,514,146 B1 * | 12/2019 | Stowell ................. F21S 43/195 |
| 2004/0160786 A1 | 8/2004 | Bauer et al. |
| 2016/0200241 A1 | 7/2016 | Snider |
| 2018/0187858 A1 * | 7/2018 | Serrano ................. B60Q 1/268 |

FOREIGN PATENT DOCUMENTS

| | | |
|---|---|---|
| JP | H0455138 A | 2/1992 |
| JP | H0569777 A | 3/1993 |
| KR | 20100021263 A | 2/2010 |
| WO | 2017006097 A1 | 1/2017 |

* cited by examiner

WINDOW MOUNTED LIGHTING ASSEMBLY

CROSS-REFERENCE TO RELATED APPLICATION

This application claims the benefit of priority to U.S. Provisional Patent Application No. 62/899,805, filed Sep. 13, 2019, the entire disclosure of which is hereby incorporated herein by reference.

TECHNICAL FIELD OF THE INVENTION

The invention generally relates to a lighting assembly, particularly a lighting assembly that is mounted directly to a window.

BACKGROUND OF THE INVENTION

A central stop (brake) lamp mounted higher than the vehicle's left and right stop lamps and called a "center high mount stop lamp (CHMSL) is required on motor vehicles in many countries. The CHMSL is intended to provide a warning to drivers whose view of the vehicle's left and right stop lamps is blocked by interceding vehicles. It also provides a redundant stop light signal in the event of a stop lamp malfunction. On passenger cars, the CHMSL may typically be placed above the back glass, affixed to the vehicle's interior just inside the back glass, or it may be integrated into the vehicle's rear deck lid. Trucks, vans, and commercial vehicles sometimes have the CHMSL mounted to the trailing edge of the vehicle's roof.

BRIEF SUMMARY OF THE INVENTION

According to one embodiment of the invention, a lighting assembly is provided. The lighting assembly includes a circuit board substrate having first and second conductive traces, a light emitting electrical device, and a pair of electrical terminals interconnected to the light emitting electrical device by the first and second conductive traces. The pair of electrical terminals are configured to mechanically secure the lighting assembly to a pair of corresponding electrical terminals mounted on a panel. The pair of electrical terminals are further configured to electrically connect the light emitting electrical device to third and fourth conductive circuit traces disposed on a surface of the panel.

In an example embodiment having one or more features of the lighting assembly of the previous paragraph, the light emitting electrical device is a light emitting diode.

In an example embodiment having one or more features of the lighting assembly of the previous paragraph, the pair of electrical terminals are receptacle terminals that each have a connection portion defining an aperture and a plurality of contact springs surrounding the aperture. The pair of corresponding electrical terminals are plug terminals attached to the third and fourth conductive circuit traces disposed on a surface of the panel. The receptacle terminals are configured to exert a contact force on the plug terminals.

In an example embodiment having one or more features of the lighting assembly of the previous paragraph, the lighting assembly further includes a housing defining an opening and a cavity within, wherein the circuit board substrate is disposed within the cavity and a complaint gasket surrounding the opening and configured to be disposed intermediate the housing and the panel.

In an example embodiment having one or more features of the lighting assembly of the previous paragraph, the light emitting electrical device comprises a plurality of light emitting diodes.

In an example embodiment having one or more features of the lighting assembly of the previous paragraph, a first portion of the plurality of light emitting diodes emits red light.

In an example embodiment having one or more features of the lighting assembly of the previous paragraph, a second portion of the plurality of light emitting diodes emits white light.

In an example embodiment having one or more features of the lighting assembly of the previous paragraph, the light emitting electrical device is a light emitting diode.

According to another embodiment of the invention, a window assembly of a motor vehicle is provided. The window assembly includes the lighting assembly of the previous paragraph and a transparent window panel having the third and fourth conductive circuit traces disposed on a surface of the window panel and corresponding plug terminals attached to the third and fourth conductive circuit traces, wherein the pair of electrical terminals are connected to the corresponding plug terminals, thereby mechanically securing the lighting assembly to the window panel and electrically connecting the light emitting electrical device to the third and fourth conductive circuit traces.

In an example embodiment having one or more features of the window assembly of the previous paragraph, the window panel is formed of a glass material.

In an example embodiment having one or more features of the window assembly of the previous paragraph, the window panel has a luminous transmittance greater than or equal to 0.9.

In an example embodiment having one or more features of the window assembly of the previous paragraph, the window panel is a rear window of a motor vehicle.

In an example embodiment having one or more features of the window assembly of the previous paragraph, the third and fourth conductive circuit traces are configured to heat the window panel.

In an example embodiment having one or more features of the window assembly of the previous paragraph, the third and fourth conductive circuit traces are an antenna of a radio receiver.

In an example embodiment having one or more features of the window assembly of the previous paragraph, the lighting assembly is configured to illuminate an area outside of the motor vehicle.

In an example embodiment having one or more features of the window assembly of the previous paragraph, the lighting assembly is a center high mounted stop light.

In an example embodiment having one or more features of the window assembly of the previous paragraph, the lighting assembly is a work light.

In an example embodiment having one or more features of the window assembly of the previous paragraph, the lighting assembly is a signal light.

In an example embodiment having one or more features of the window assembly of the previous paragraph, the lighting assembly is configured to illuminate an area within the motor vehicle.

In an example embodiment having one or more features of the window assembly of the previous paragraph, the lighting assembly is a courtesy light.

In an example embodiment having one or more features of the window assembly of the previous paragraph, the lighting assembly is a warning light.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Reference will now be made in detail to embodiments, examples of which are illustrated in the accompanying drawings. In the following detailed description, numerous specific details are set forth to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
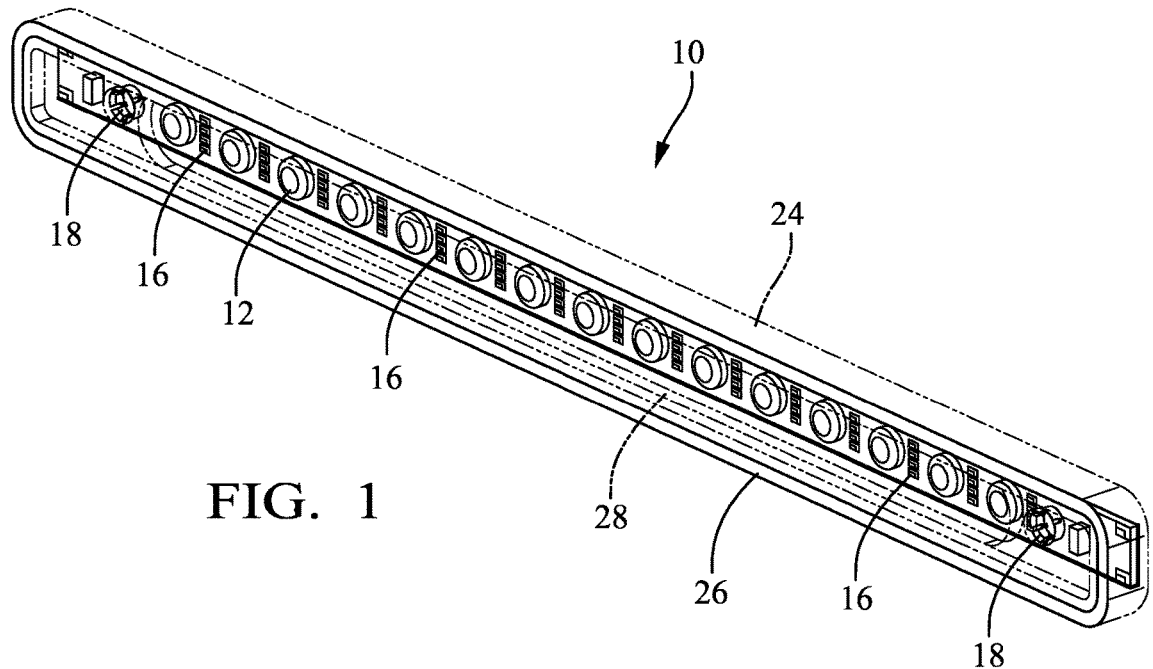
FIG. 1 is a perspective view of a lighting assembly according to a first embodiment of the invention.
Figure 2:
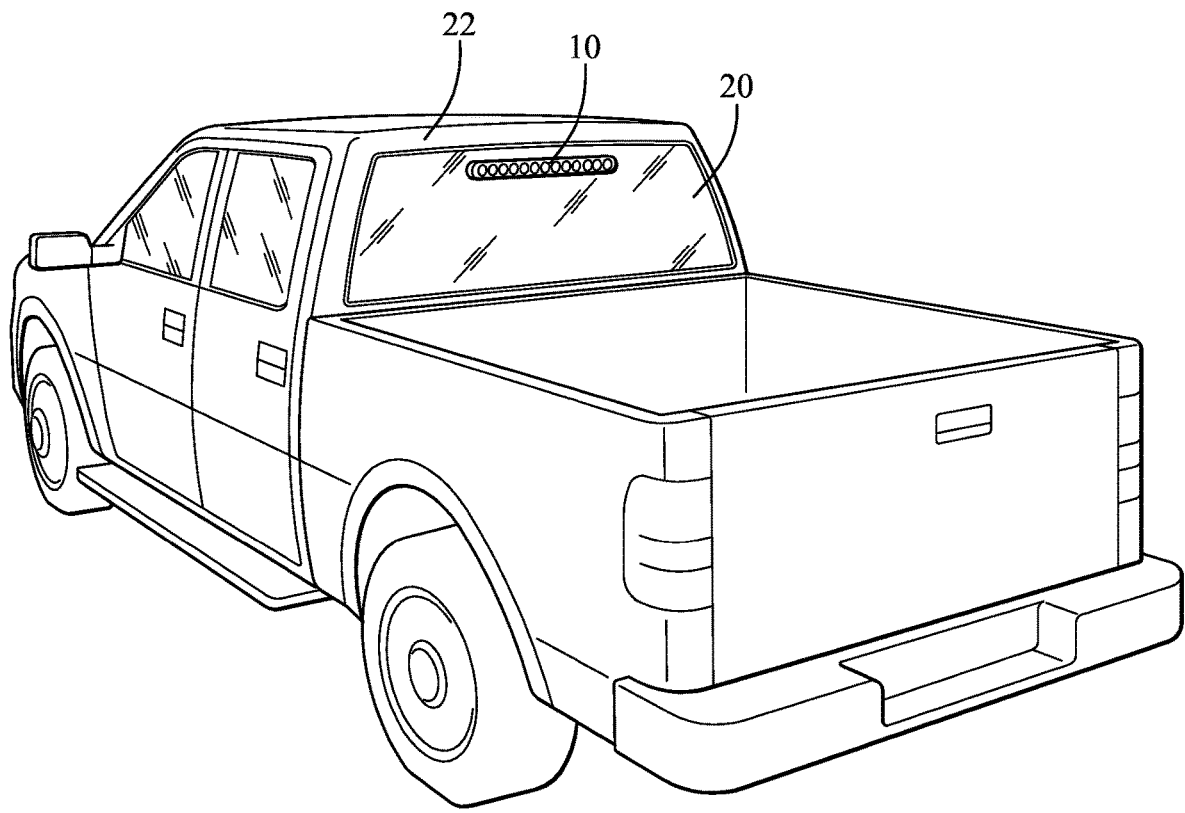
FIG. 2 is a perspective view of the lighting assembly of FIG. 1 installed on a window assembly of a motor vehicle according to a second embodiment of the invention.
Figure 3:
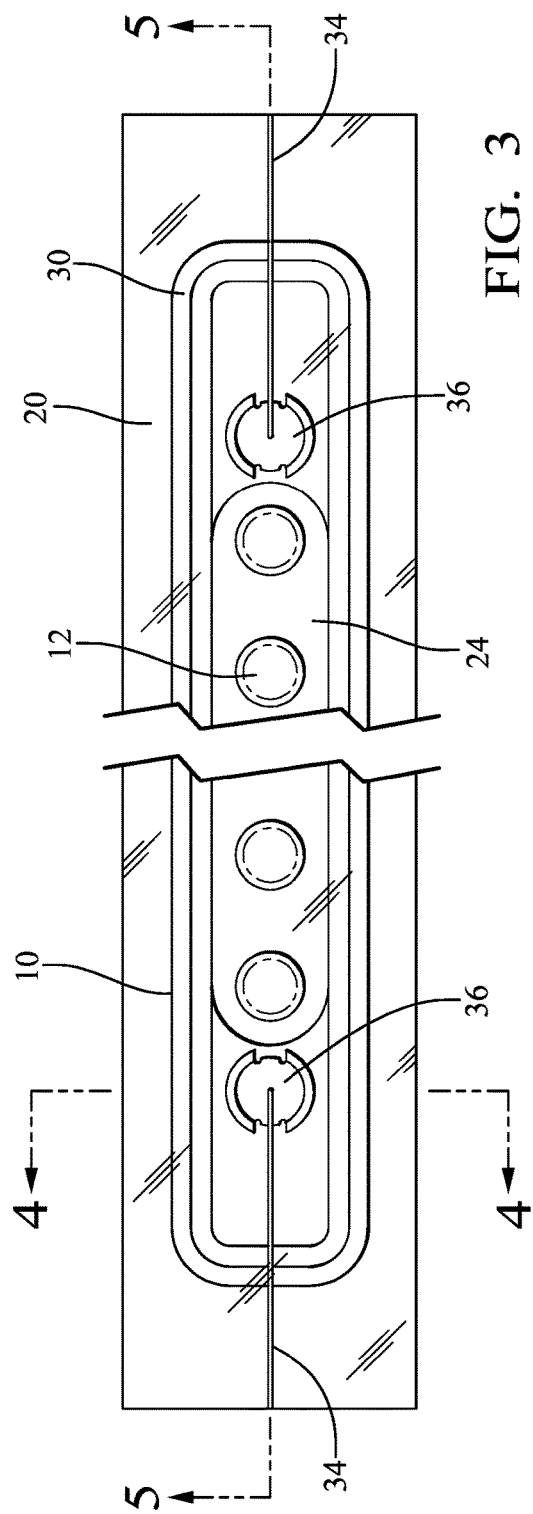
FIG. 3 is a front view of the lighting assembly of FIG. 1 mounted to the window assembly of FIG. 2 according to the second embodiment of the invention.

FIG. 1 illustrates a non-limiting example of a lighting assembly 10 that is configured to be mounted directly to a window assembly. The lighting assembly 10 includes a light emitting electrical device, e.g. a light emitting diode (LED) array 12. The LED array 12 is mounted on a printed circuit board (PCB) 14. The PCB 14 may use a circuit board substrate that is formed of epoxy or polyimide resins. The resin may be reinforced with a woven glass cloth or other matrix such as chopped fibers. Substrates formed of such materials are typically referred to as FR-4 or G-10 type circuit boards. The PCB 14 may alternatively be constructed of ceramic or rigid polymer materials. This listing of acceptable substrate materials is not exhaustive and other materials may also be used successfully. A layer of conductive material, such as a copper-based material is electroplated on at least one major surface of the PCB 14. The layer of conductive material is then formed to create power and ground circuit traces, hereinafter referred to as the PCB power and ground traces 16, that are connected to and provide electrical power to the LED array 12. A pair of electrical terminals 18 are interconnected to the LED array 12 by the PCB power and ground traces 16. The pair of electrical terminals 18 are configured to mechanically secure the lighting assembly 10 to a pair of corresponding electrical terminals that are mounted on a panel 20, such as a rear window of a motor vehicle 22 as shown in FIG. 2. The pair of electrical terminals 18 are further configured to electrically connect the LED array 12 to conductive power and ground traces circuit traces disposed on a surface of the panel 20. The pair of electrical terminals 18 may be connected directly to the PCB power and ground traces 16, e.g. by a soldering process, or the lighting assembly 10 may include a wire cables intermediate the pair of electrical terminals 18 and the PCB power and ground traces 16.

The lighting assembly 10 also includes a housing 24 that defines an opening 26 and a cavity 28 within the housing 24 in which the PCB 14 is disposed. The lighting assembly 10 further includes a complaint gasket 30 surrounding the opening 26. The gasket 30 is disposed intermediate the housing 24 and the panel 20. This gasket 30 may be formed of an expanded polymer foam material or a silicone-based material and inhibits the intrusion of environmental contaminants into the housing 24 and inhibits undesirable light leakage from the interface between the housing 24 and the panel 20.

FIGS. 2-11 illustrate a non-limiting example of a window assembly 32 on which the lighting assembly 10 described above is mounted. The window assembly includes a transparent window panel 20 of made of glass, polycarbonate, or any other transparent material suitable for the window application. Power and ground traces, hereinafter referred to as the window power and ground traces 34, via the corresponding electrical terminals 36 are disposed on a surface 38 of the window panel 20. The window power and ground traces 34 may be printed onto the window panel 20 using a conductive material, such as a silver-based ink. The window power and ground traces 34 may be dedicated circuits or they may be incorporated into a window heating element or a window mounted antenna.

The pair of electrical terminals 18 are receptacle terminals 18 that each have a connection portion defining an aperture and a plurality of contact springs surrounding the aperture. The pair of corresponding electrical terminals 36 are plug terminals 36 attached to the window power and ground traces 34 disposed on the surface 38 of the window panel 20. The receptacle terminals 18 are configured to exert a contact force on the plug terminals 36.

The receptacle and plug terminals 18, 36 are preferably a snap fit design. Each receptacle terminal 18 has a generally circular base plate and several contact arms extending from this base plate. The contact arms form a circular female socket having an opening that is configured to receive and engage the plug terminal 36. Each plug terminal 36 has a generally cylindrical post shape with a tapered or flared outer sidewall. The sidewall tapers outwardly from near the base to the end of the plug terminal 36. The socket of the receptacle terminal 18 is sized such that it has a diameter that is less than the end of the plug terminal 36. Since the diameter of the opening of the socket of the receptacle terminal 18 is less than the minimum diameter of the plug terminal 36, the contact arms flex outwardly as concave curved portion of the contact arms contact the end of the plug terminal 36. The receptacle terminal 18 then snaps in place as the contact arms move down the plug terminal 36 to the tapered portion that has a smaller diameter than the end of the plug terminal 36, thereby mechanically connecting the receptacle terminal 18 to the plug terminal 36. The inner apex surfaces of the concave curved portion of the contact arms are in compressive contact with the plug terminal 36, thereby providing a robust electrical connection between the receptacle terminal 18 and the plug terminal 36.

Figure 4:
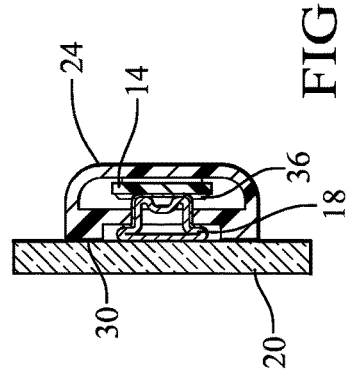
FIG. 4 is a side cross section view of the lighting and window assemblies of FIG. 3 along the section line A-A to the second embodiment of the invention.
Figure 5:
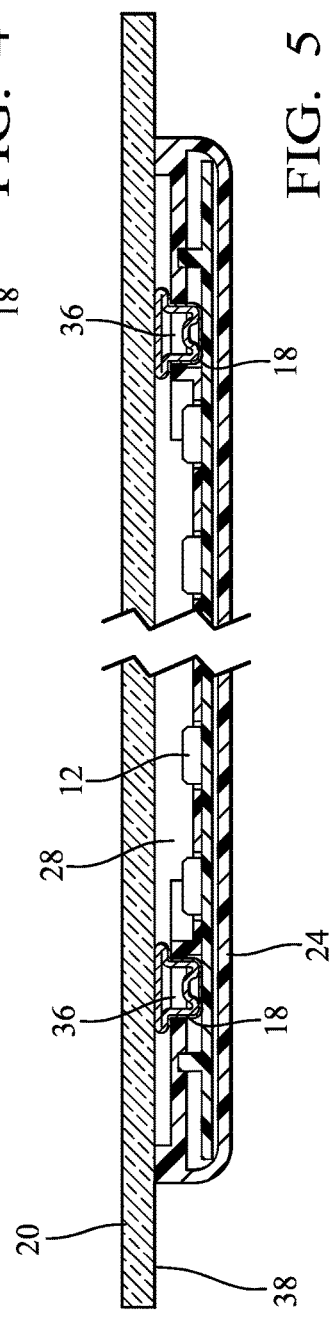
FIG. 5 is a top cross section view of the lighting and window assemblies of FIG. 3 along the section line B-B according to the first embodiment of the invention.
Figure 6:
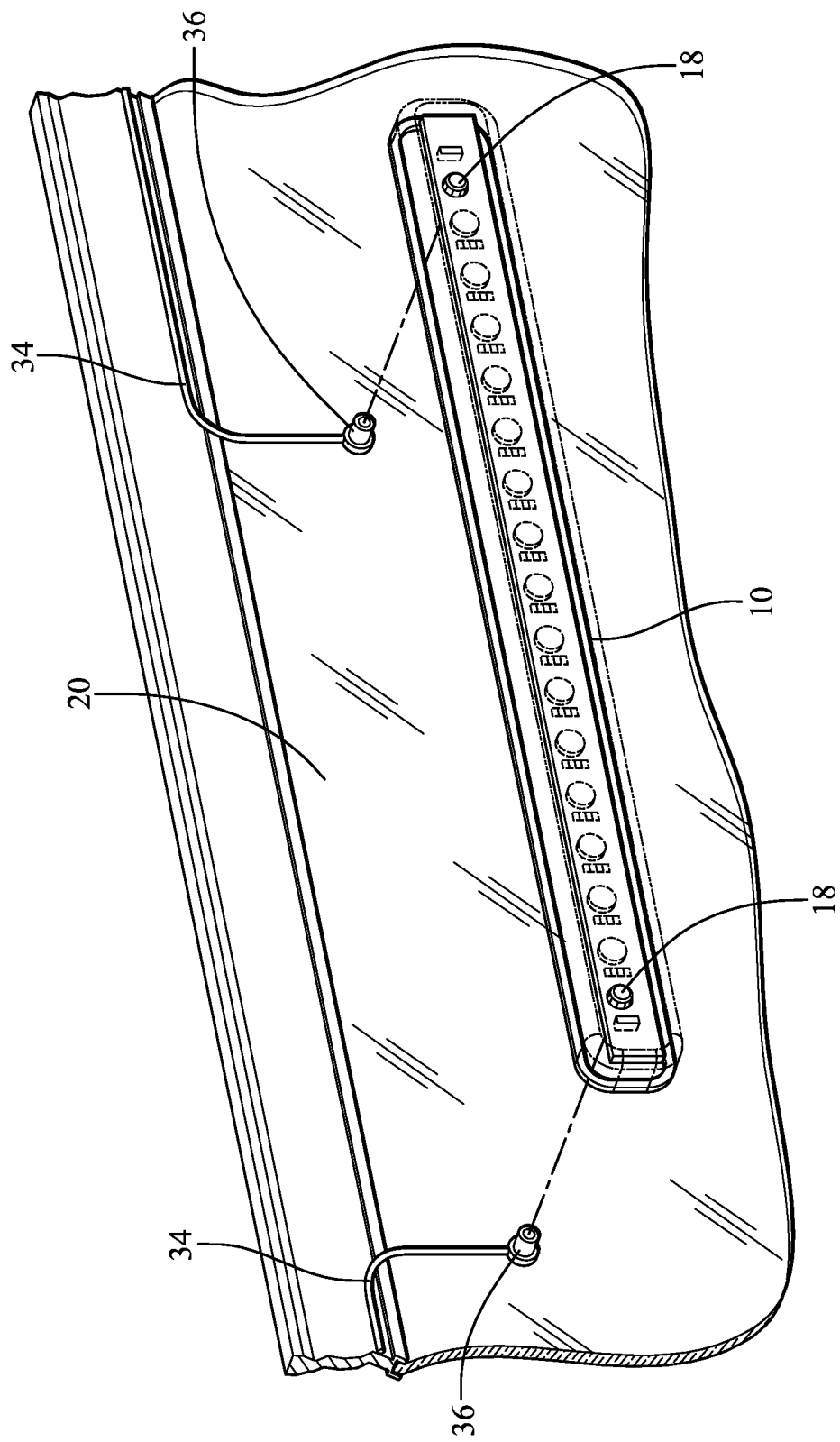
FIG. 6 is a perspective view of the lighting assembly of FIG. 1 in the process of being installed on a window assembly of FIG. 2 according to the second embodiment of the invention.
Figure 7:
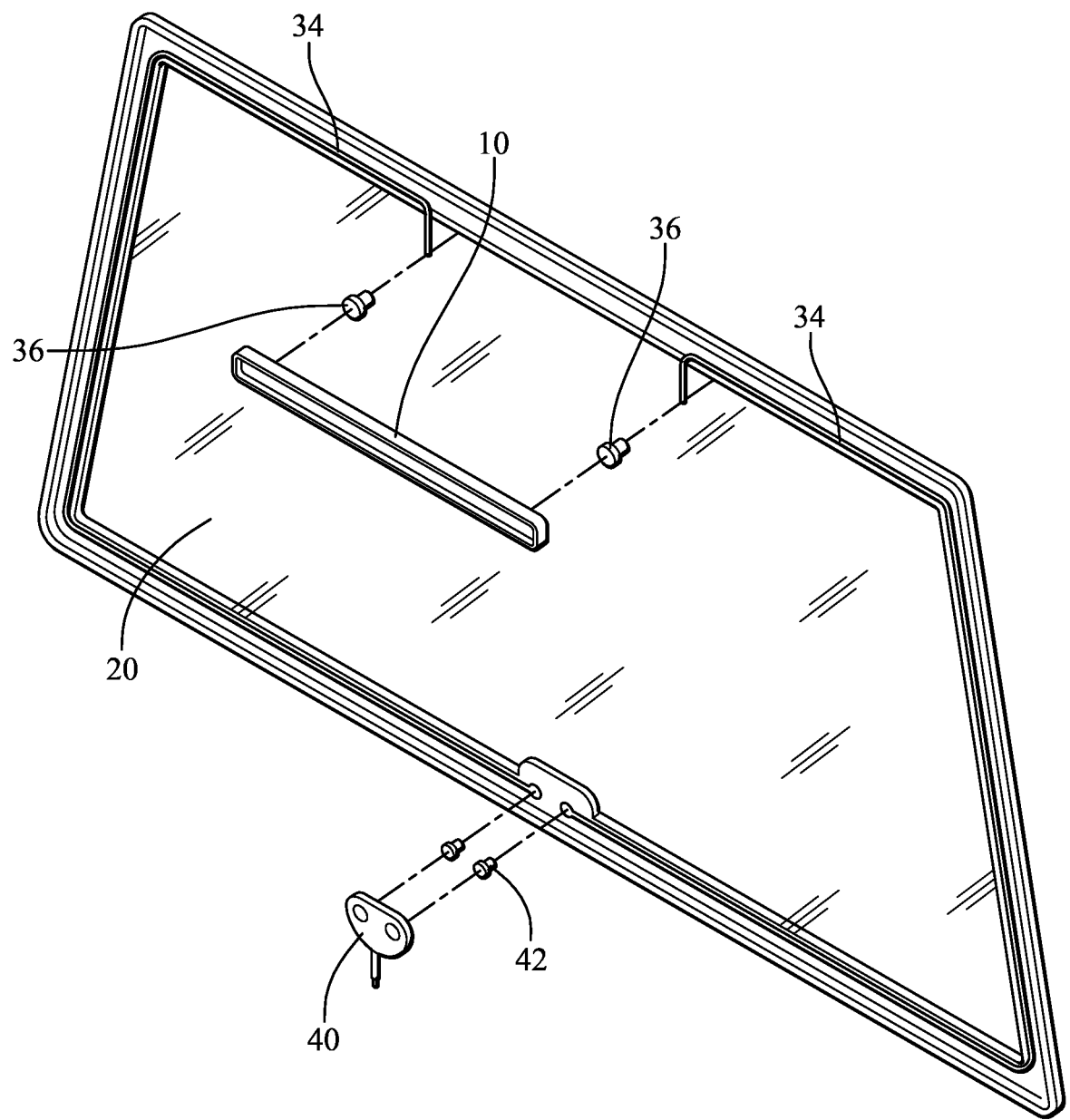
FIG. 7 is another perspective view of the lighting assembly of FIG. 1 in the process of being installed on the window assembly of FIG. 2 according to the second embodiment of the invention.
Figure 8:
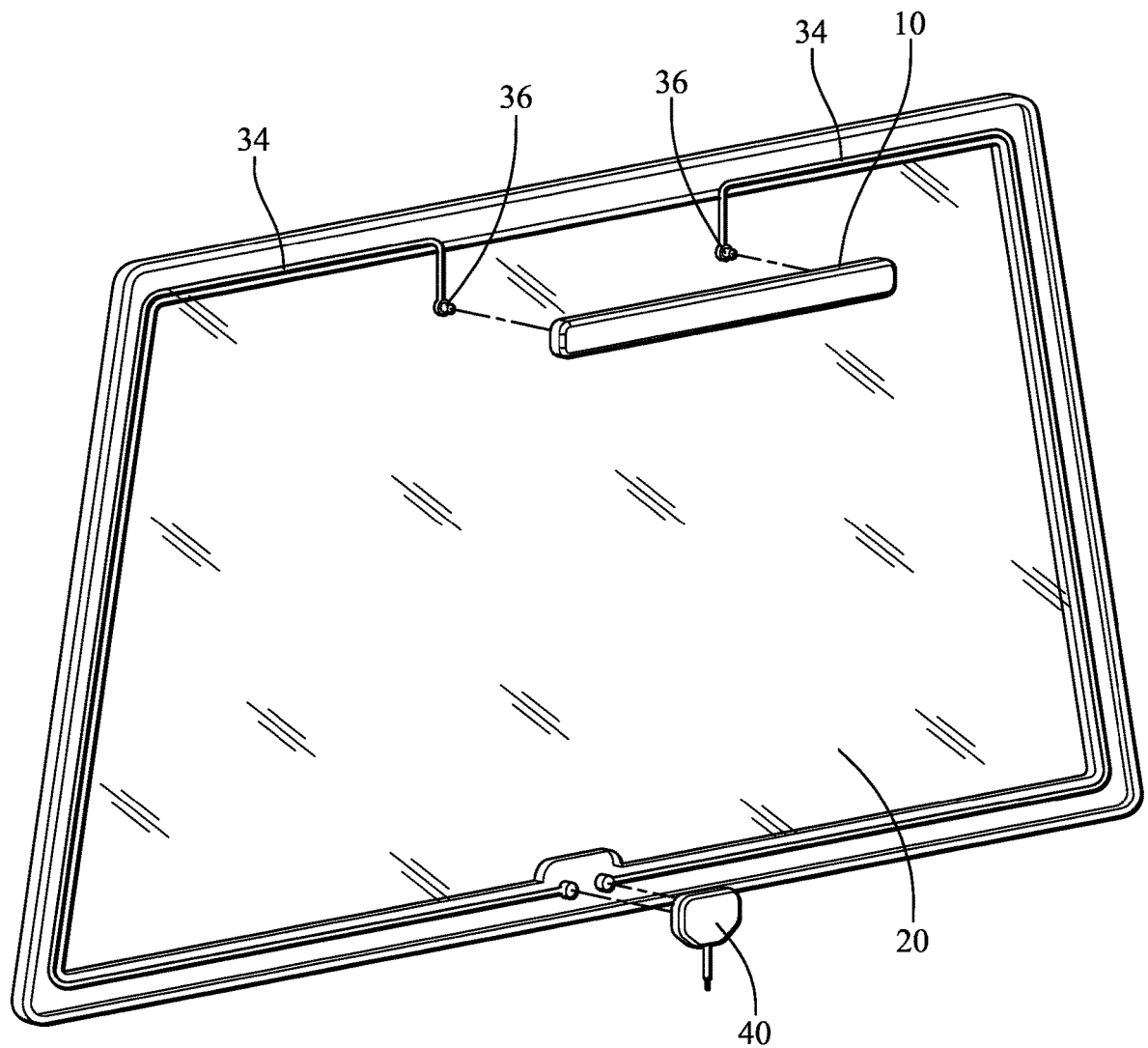
FIG. 8 is yet another perspective view of the lighting assembly of FIG. 1 in the process of being installed on the window assembly of FIG. 2 according to the second embodiment of the invention.
Figure 9:
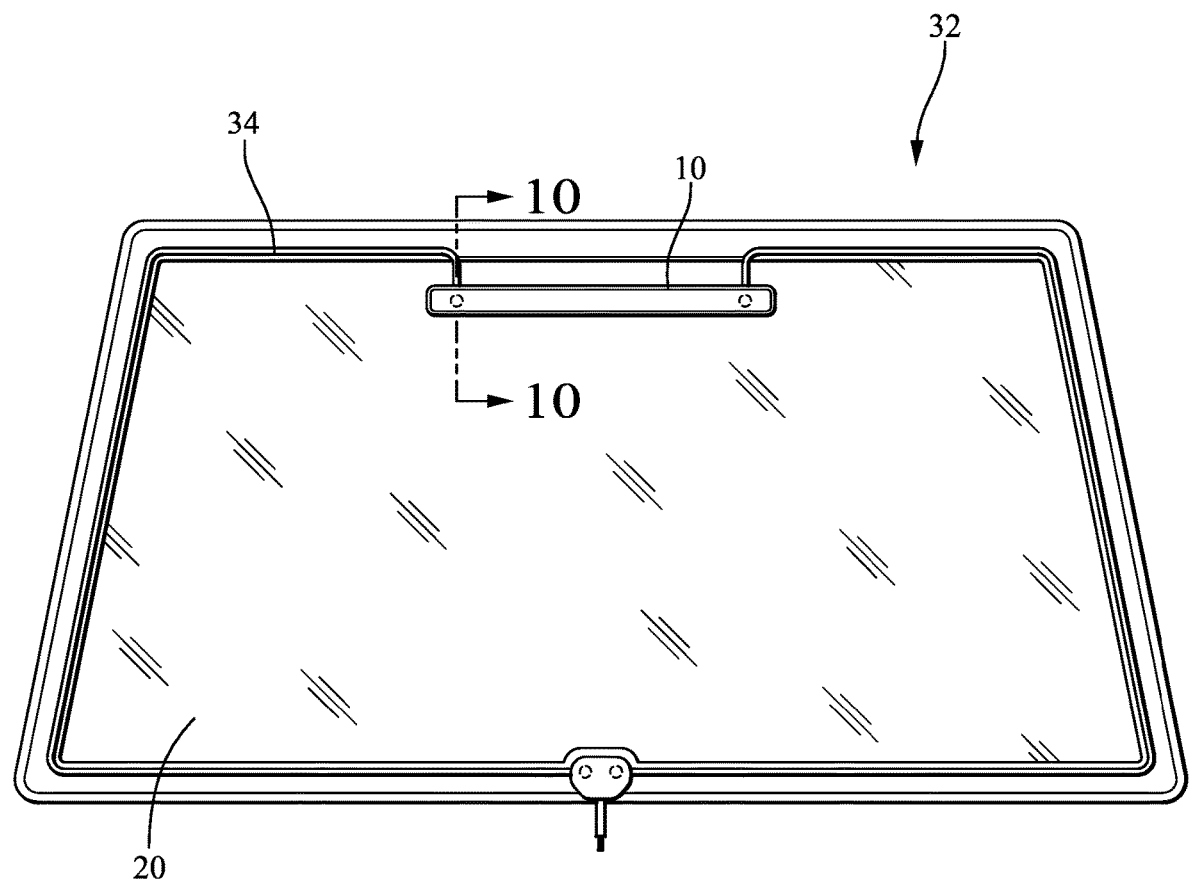
FIG. 9 is a front view of the lighting assembly of FIG. 1 installed on the window assembly of FIG. 2 according to the second embodiment of the invention.
Figure 10:
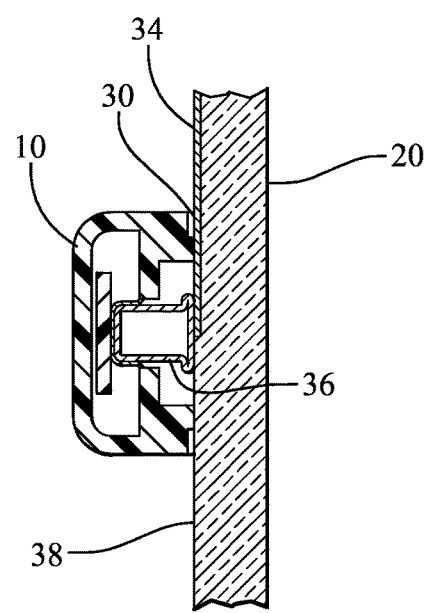
FIG. 10 is a cross section side view of the lighting and window assemblies shown in FIG. 9 along the section line A-A according to the second embodiment of the invention.
Figure 11:
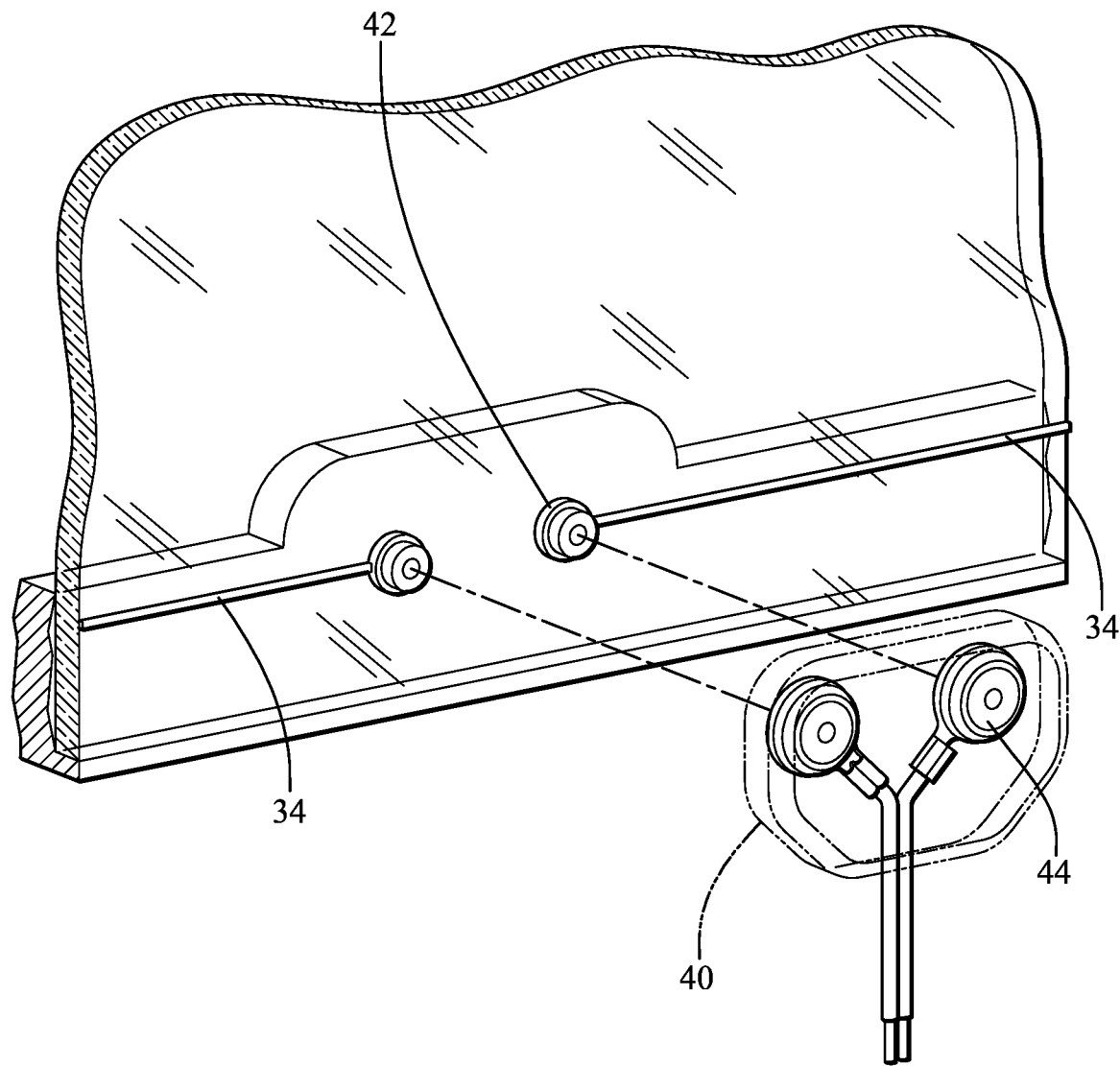
FIG. 11 is perspective view of an electrical power connector in the process of being installed on the window assembly of FIG. 2 according to the second embodiment of the invention.

The plug terminals 36 are attached to the window power and ground traces 34. When the pair of receptacle terminals 18 are connected to the corresponding plug terminals 36, as best shown in FIGS. 4 and 10, they mechanically secure the lighting assembly 10 to the window panel 20 as well as electrically connect the LED array 12 to the window power and ground traces 34. The size and weight of the lighting assembly 10 is such that it is secured to the window solely by the receptacle and plug terminals 18, 36 without the need for any other support structure. FIG. 11 illustrates another connector 40 using similar plug and receptacle terminals 42, 44 to connect the window power and ground traces 34 to the vehicle's electrical system.

In FIG. 2, the lighting assembly 10 installed in a rear window of a pick-up truck. In this application, the LED array 12 emits red light to provide a center high mount stop lamp (CHMSL). In this application, it may be advantageous to configure the lighting assembly 10 such that a first portion of the LED array 12 emits red light to provide the CHMSL while a second portion of the LED array 12 emits white light to provide a work light for the bed of the pick-up truck.

The lighting assembly 10 may also be configured with a red or amber LED to provide turn signal or other signaling functions, e.g. school bus stop flashers or emergency vehicle flashers on the front, rear, or side windows of the vehicle 22. While the previously described embodiments provide light outside the vehicle 22, the lighting assembly 10 may also be configured to provide light within a vehicle cabin, e.g. providing dome lights or courtesy lights.

Accordingly, a lighting assembly 10 that can be mounted directly to a panel 20, such as a vehicle window panel 20, is provided. The lighting assembly 10 offers the benefits of delivering lighting on a motor vehicle 22 without assigning dedicated packaging space within the vehicle structure. It also provides an easily serviceable lighting assembly 10 that can be removed and re-installed by merely disconnecting and reconnecting two sets of terminals 18, 36.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

We claim:
1. A lighting assembly, comprising:
a circuit board substrate having first and second conductive traces;
a light emitting electrical device; and
a pair of electrical receptacle terminals interconnected to the light emitting electrical device by the first and second conductive traces, wherein the pair of electrical receptacle terminals have a circular base plate mounted on a panel and a plurality of contact arms extending from this base plate forming a female socket configured to mechanically secure the lighting assembly to a pair of corresponding electrical plug terminals having a cylindrical post shape with a tapered or flared outer sidewall and wherein the electrical plug terminals are further configured to electrically connect the light emit- ting electrical device to third and fourth conductive circuit traces disposed on a surface of the panel.

2. The lighting assembly according to claim 1, wherein the light emitting electrical device is a light emitting diode.

3. The lighting assembly according to claim 1, wherein a diameter of an opening of the socket of the electrical receptacle terminals is less than a minimum diameter of the electrical plug terminals, wherein the contact arms are configured to flex outwardly as a concave curved portion of the contact arms contact ends of the electrical plug terminals, wherein the electrical receptacle terminals are configured to snap in place as the contact arms move down the electrical plug terminals to the tapered portions which have smaller diameters than the end of the electrical plug terminals, and wherein inner apex surfaces of the concave curved portions of the contact arms are configured to be in compressive contact with the electrical plug terminals.

4. The lighting assembly according to claim 1, further comprising:
 a housing defining an opening and a cavity within, wherein the circuit board substrate is disposed within the cavity; and
 a complaint gasket surrounding the opening and configured to be disposed intermediate the housing and the panel.

5. The lighting assembly according to claim 1, wherein the light emitting electrical device comprises a plurality of light emitting diodes.

6. The lighting assembly according to claim 5, wherein a first portion of the plurality of light emitting diodes emits red light.

7. The lighting assembly according to claim 6, wherein a second portion of the plurality of light emitting diodes emits white light.

8. A window assembly of a motor vehicle, comprising:
 a circuit board substrate having first and second conductive traces;
 a light emitting electrical device; and
 a pair of electrical receptacle terminals interconnected to the light emitting electrical device by the first and second conductive traces, wherein the pair of electrical receptacle terminals have a circular base plate mounted on a panel and a plurality of contact arms extending from this base plate forming a female socket configured to mechanically secure the lighting assembly to a pair of corresponding electrical plug terminals having a cylindrical post shape with a tapered or flared outer sidewall and wherein the electrical plug terminals are further configured to electrically connect the light emitting electrical device to third and fourth conductive circuit traces disposed on a surface of the panel, wherein the panel is a transparent window panel of a motor vehicle.

9. The window assembly according to claim 8, wherein the window panel is formed of a glass material.

10. The window assembly according to claim 8, wherein the window panel has a luminous transmittance greater than or equal to 0.9.

11. The window assembly according to claim 8, wherein the window panel is a rear window of the motor vehicle.

12. The window assembly according to claim 8, wherein the third and fourth conductive circuit traces are configured to heat the window panel.

13. The window assembly according to claim 8, wherein the third and fourth conductive circuit traces are an antenna of a radio receiver.

14. The window assembly according to claim 8, wherein the lighting assembly is configured to illuminate an area outside of the motor vehicle.

15. The window assembly according to claim 14, wherein the lighting assembly is a center high mounted stop light.

16. The window assembly according to claim 14, wherein the lighting assembly is a work light.

17. The window assembly according to claim 14, wherein the lighting assembly is a signal light.

18. The window assembly according to claim 8, wherein the lighting assembly is configured to illuminate an area within the motor vehicle.

19. The window assembly according to claim 18, wherein the lighting assembly is a courtesy light.

20. The window assembly according to claim 18, wherein the lighting assembly is a warning light.

* * * * *